(12) United States Patent
Ding et al.

(10) Patent No.: US 7,995,488 B2
(45) Date of Patent: Aug. 9, 2011

(54) CONNECTIVITY FAULT MANAGEMENT FOR ETHERNET TREE (E-TREE) TYPE SERVICES

(75) Inventors: Zhemin Ding, Solna (SE); Panagiotis Saltsidis, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 126 days.

(21) Appl. No.: 12/443,195

(22) PCT Filed: Feb. 18, 2009

(86) PCT No.: PCT/SE2009/050172
§ 371 (c)(1),
(2), (4) Date: Mar. 27, 2009

(87) PCT Pub. No.: WO2009/102278
PCT Pub. Date: Aug. 20, 2009

(65) Prior Publication Data
US 2010/0182913 A1    Jul. 22, 2010

Related U.S. Application Data

(60) Provisional application No. 61/032,527, filed on Feb. 29, 2008.

(51) Int. Cl.
*H04L 12/26* (2006.01)
(52) U.S. Cl. ...................................... 370/245; 370/241.1
(58) Field of Classification Search .......................... None
See application file for complete search history.

(56) References Cited

U.S. PATENT DOCUMENTS

| | | |
|---|---|---|
| 2002/0038253 A1* | 3/2002 | Seaman et al. ................ 709/238 |
| 2007/0140126 A1 | 6/2007 | Osswald et al. |
| 2007/0223493 A1 | 9/2007 | Sridhar et al. |
| 2007/0268817 A1 | 11/2007 | Smallegange et al. |
| 2008/0112331 A1* | 5/2008 | Long et al. .................... 370/245 |

OTHER PUBLICATIONS

IEEE std 802.1ag-2007, "IEEE Standard for Local and metropolitan area networks—Virtual Bridged Local Area Networks. Amendment 5: Connectivity Fault Management," Dec. 17, 2007, pp. 1-260.*
IEEE: "IEEE P802.1AG/D8.1 Draft Standard for Local and Metropolitan Area Networks—Virtual Bridged Local Area Networks Amendment 5: Connectivity Fault Management" [Online] Jun. 18, 2007,,Piscataway. NJ. USA , XPOO2526014 Retrieved from the Internet: URL:http://ieeexplore.ieee.org/stamp/stamp D.jsp?arnumber=4343668&isnumber=4343667> pp. I-XIII, pp. 114-181 the whole document.
Green H; Monette S; Olsson J; Saltsidis P, Takacs A: "Carrier Ethernet: The native approach" Ericsson Review, [Online] 2007, pp. 84-89, XP002526013 Stockholm: Telefonaktiebolaget L.M. Ericsson, Sweden ISSN: 0014-0171 Retrieved from the Internet: URL:http://www.ericsson.com/ericsson/corpi nfo/publications/review/2007_03/files/3_CarrierEthernet.pdf> [retrieved on Apr. 28, 2009] the whole document.

(Continued)

*Primary Examiner* — Jayanti K. Patel
*Assistant Examiner* — Matthew Campbell

(57) ABSTRACT

A Maintenance Association and corresponding method for configuring maintenance entities for Ethernet Tree (E-Tree) type service instances. A root MEP communicates with each of a plurality of leaf MEPs. Remote MEP state machine instances are activated within the root MEP for each of the plurality of leaf MEPs. Within each leaf MEP, however, only the remote MEP state machine instance for the root MEP is activated while leaving the remote MEP state machine instances for all other leaf MEPs in an inactive state in which Connectivity Check Messages (CCMs) are not exchanged.

3 Claims, 4 Drawing Sheets

OTHER PUBLICATIONS

Carsten Rossenhoevel, EANTC, European Advanced Networking Test Center: "Carrler Ethernet World Congress—Public Multi-Vendor Carrler Ethernet Interoperability Test" Carrier Ethernet World Congress—Third Multi-Vendor Carrier Ethernet Interoperability Test Event, XP002526012 Geneva, Switzerland Retrieved from the Internet: URL:http://www.eantc.com/fileadmin/eantc/downloads/events/2007-2010/CEWC07/EANTC-CEW C07-WhltePaper-Final5.pdf> [retrieved on Apr. 29, 2009] the whole document.

IEEE: "IEEE P802.1AG/D8.1 Draft Standard for Local and Metropolitan Area Networks Virtual Bridged Local Area Networks Amendment 5: Connectivity Fault Management" [Online] Jun. 18, 2007, , Piscataway, NJ, USA, XP002526011 Retrleved from the Internet: URL:http://ieeexplore.ieee.org/stamp/stamp D.jsp?arnumber=4343668&1snumber=4343667> [retrieved on Apr. 29, 2009] pp. I-XIII, pp. 1-47 the whole document.

IEEE: "IEEE P802.1AG/D8.1 Draft Standard for Local and Metropolitan Area Networks Virtual Bridged Local Area Networks Amendment 5: Connectivity Fault Management" [Online] Jun. 18, 2007,, Piscataway, NJ. USA ,XP002526015 Retrieved from the Internet: URL: http://ieeexplore.ieee.org/stamp/stamp D.jsp?arnumber=4343668&isnumber=4343667> [retrieved on Apr. 29, 2009] pp. I-XIII. pp. 182-225 the whole document.

The Metro Ethernet Forum: "Technical Specification' MEF 10.1 Ethernet Services Attributes Phase 2" , Technical Specification MEF 10.1 Ethernet Services Attributes Phase 2. [Online] Nov. 1, 2006, pp. I-IV-I-59. XP002526016 Internet, Cal lfornla, USA Retrieved from the Internet: URL:www.metroethernetforum.org/pdfs/standa rds/mefl0.1.doc> [retrieved on Apr. 29, 2009] the whole document.

Saltsidis: "IEEE802.1OAY Project Status" IEEE802.1QAY Project Status. [Online] May 20, 2008, XP002526017 ericsson,Sweden Retrieved from the Internet: URL:http://www.ieee802.org/1/files/public/ docs2008/ay-saltsidis-project-status-0508v01. pdf> [retrieved on Apr. 29, 2009] the whole document.

\* cited by examiner

CONNECTIVITY FAULT MANAGEMENT FOR ETHERNET TREE (E-TREE) TYPE SERVICES

This application claims the benefit of U.S. Provisional Application No. 61/032,527, filed Feb. 29, 2008, the disclosure of which is fully incorporated herein by Reference.

TECHNICAL FIELD

The present invention relates to communication networks. More specifically, and without limitation, the invention is directed to a Maintenance Association and corresponding method for configuring maintenance entities for Ethernet Tree (E-Tree) type service instances.

BACKGROUND

Connectivity Fault Management (CFM), as described in IEEE 802.1ag, is a key component of operation, administration, and maintenance for carrier Ethernet. IEEE 802.1ag specifies protocols, procedures, and managed objects for end-to-end fault detection, verification, and isolation. IEEE 802.1ag establishes managed objects, called Maintenance Associations (MAs), to verify the integrity of a single service instance by exchanging CFM messages. The scope of an MA is determined by its Management Domain (MD), which describes a network region where connectivity and performance is managed. Each MA associates two or more Maintenance Association Endpoints (MEPs) and enables Maintenance Association Intermediate Points (MIPs) to support fault detection and isolation.

A continuity check protocol is used for fault detection. Each MEP periodically transmits Connectivity Check Messages (CCMs) and tracks CCMs received from other MEPs in the same maintenance association.

When a MEP managed object belonging to an MA is created, its Continuity Check Receiver maintains one instance of the Remote MEP state machine for each of the other MEPs configured for this MA. The MEP Continuity Check Receiver utilizes Remote MEP variables and state machines to track each Remote MEP. This state machine monitors the reception of valid CCMs from a Remote MEP with a specific MEPID. It uses a timer that expires in 3.25 to 3.5 times the length of time of CCM interval. If no CCM is received within the timer expiration period from a remote MEP, the Remote MEP state machine of this Remote MEP detects a defect, which can in turn generate a Fault Alarm.

A problem arises when the process specified in the current IEEE 802.1ag-2007 standard is applied to an Ethernet Tree (E-Tree) type of service instance, such as a Provider Backbone Bridge-Traffic Engineering (PBB-TE) Point-to-Multipoint service instance. In an E-Tree type of service instance, there is a root node which communicates with a plurality of leaf nodes. There is a MEP located in the root node and in each leaf node. All of these MEPs belong to the same MA, and according to IEEE 802.1ag, each MEP must be aware of all the other MEPs in the same MA, and the Continuity Check Receiver in each MEP must maintain one instance of the Remote MEP state machine for each of the other MEPs. Additionally, the Remote MEP state machine instance in each Continuity Check Receiver is required to monitor the reception of valid CCMs from each remote MEP, and indicate a defect if no CCM is received for a predefined period of time from a given MEP. As shown in FIG. 1, however, in an E-Tree type of service instance, MEPs in the leaf nodes cannot receive each other's CCMs because they only communicate with the root MEP. Therefore, if they comply with IEEE 802.1ag, the Remote MEP state machine instance in each leaf will indicate defects in the other leaf MEPs due to failure to receive their CCMs even when their operation is normal.

SUMMARY

The present invention provides a solution to avoid the defect indication when the operation of other leaf MEPs is normal. In one embodiment, the definition of an MA is modified. In the current standard, an MA is a set of MEPs, each configured with the same identifier (MAID) and MD Level, for verifying the integrity of a single service instance. A single service instance has only one MA. This embodiment of the present invention creates multiple MAs in a single service instance, and each MA contains only those MEPs that need to exchange CCMs. This solves the problem of erroneous defect indications, but requires fundamental changes of the definition of an MA and the architecture of IEEE 802.1ag.

In another embodiment requiring only a slight change of the current standard, a new configuration parameter is introduced for the MEP that indicates which remote MEP state machines are active (default should be all). For example, the MEP in the root node uses the default configuration, activating all remote MEP state machine instances, while the MEP in each leaf node only activates the remote MEP state machine of the root node.

Thus, in one embodiment, the present invention is directed to a method of configuring MEPs for an E-Tree type service instance in which a root MEP communicates with each of a plurality of leaf MEPs. The method includes the steps of creating a plurality of Maintenance Associations in the service instance, wherein each Maintenance Association includes only the root MEP and a different one of the plurality of leaf MEPs; and exchanging Connectivity Check Messages between the root MEP and the leaf MEP in each Maintenance Association, but not with MEPs in other Maintenance Associations.

In another embodiment, the present invention is directed to a method of configuring MEPs for an E-Tree type service instance in which a Maintenance Association includes a root MEP communicating with each of a plurality of leaf MEPs. The method includes the steps of activating a remote MEP state machine instance within the root MEP for each of the plurality of leaf MEPs; and activating a remote MEP state machine instance within each leaf MEP for only the root MEP while leaving the remote MEP state machine instances for all other leaf MEPs in an inactive state in which Connectivity Check Messages are not exchanged.

In another embodiment, the present invention is directed to a Maintenance Association for an E-Tree type service instance. The Maintenance Association includes a plurality of leaf MEPs and a root MEP communicating with each of the plurality of leaf MEPs. The root MEP includes a plurality of activated remote MEP state machine instances, wherein a remote MEP state machine instance is activated for each of the leaf MEPs. Each of the leaf MEPs includes a single activated remote MEP state machine instance for only the root MEP. In each leaf MEP, remote MEP state machine instances for other leaf MEPs are in an inactive state in which Connectivity Check Messages are not exchanged.

BRIEF DESCRIPTION OF THE DRAWINGS

In the following, the essential features of the invention will be described in detail by showing preferred embodiments, with reference to the attached figures in which.

DETAILED DESCRIPTION

Figure 1:
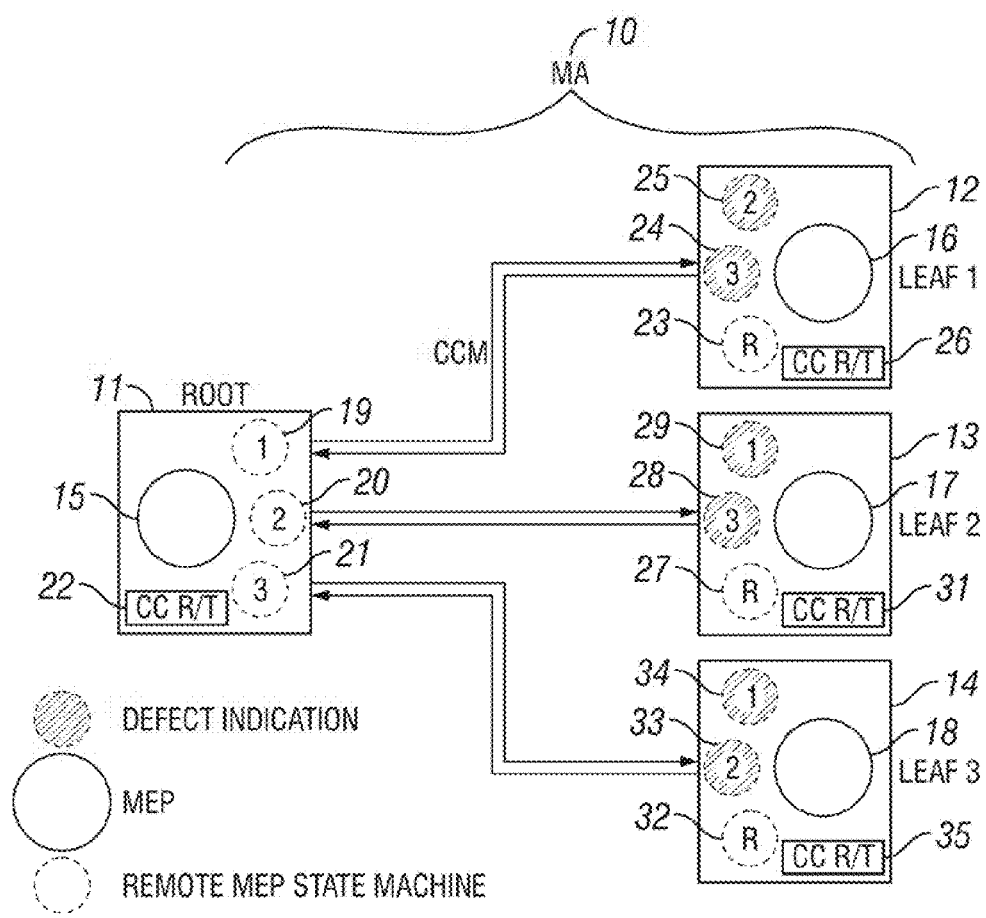
FIG. 1 (Prior Art) is a functional block diagram illustrating an architecture of an E-Tree type service instance with a Maintenance Association configured in accordance with IEEE 802.1ag-2007.

FIG. 1 is a functional block diagram illustrating an architecture of an E-Tree type service instance with a Maintenance Association 10 configured in accordance with IEEE 802.1ag-2007. A root node 11 communicates with a plurality of leaf nodes 12-14. The root node includes a MEP 15, and the leaf nodes include MEPs 16-18, respectively. The root node also includes three Remote MEP state machine instances 19-21 (one for the each of the Leaf MEPs 16-18), and a Continuity Check Receiver/Transmitter 22. Leaf-1 includes the MEP 16, three Remote MEP state machine instances 23-25 (one for the root MEP 15, one for the Leaf-2 MEP 17, and one for the Leaf-3 MEP 18), and a Continuity Check Receiver/Transmitter 26. Leaf-2 includes the MEP 17, three Remote MEP state machine instances 27-29 (one for the root MEP 15, one for the Leaf-1 MEP 16, and one for the Leaf-3 MEP 18), and a Continuity Check Receiver/Transmitter 31. Leaf-3 includes the MEP 18, three Remote MEP state machine instances 32-34 (one for the root MEP 15, one for the Leaf-1 MEP 16, and one for the Leaf-2 MEP 17), and a Continuity Check Receiver/Transmitter 35.

The Remote MEP state machine instance in each Continuity Check Receiver monitors the reception of valid CCMs from each remote MEP, and indicates a defect if no CCM is received for a predefined period of time from a given MEP. As shown in FIG. 1, however, in an E-Tree type of service instance, MEPs 16-18 in the leaf nodes cannot receive each other's CCMs because they only communicate with the root MEP 15. Therefore, if they comply with IEEE 802.1ag, the Remote MEP state machine instance in each leaf will indicate defects in the other leaf MEPs even when their operation is normal.

Figure 2:
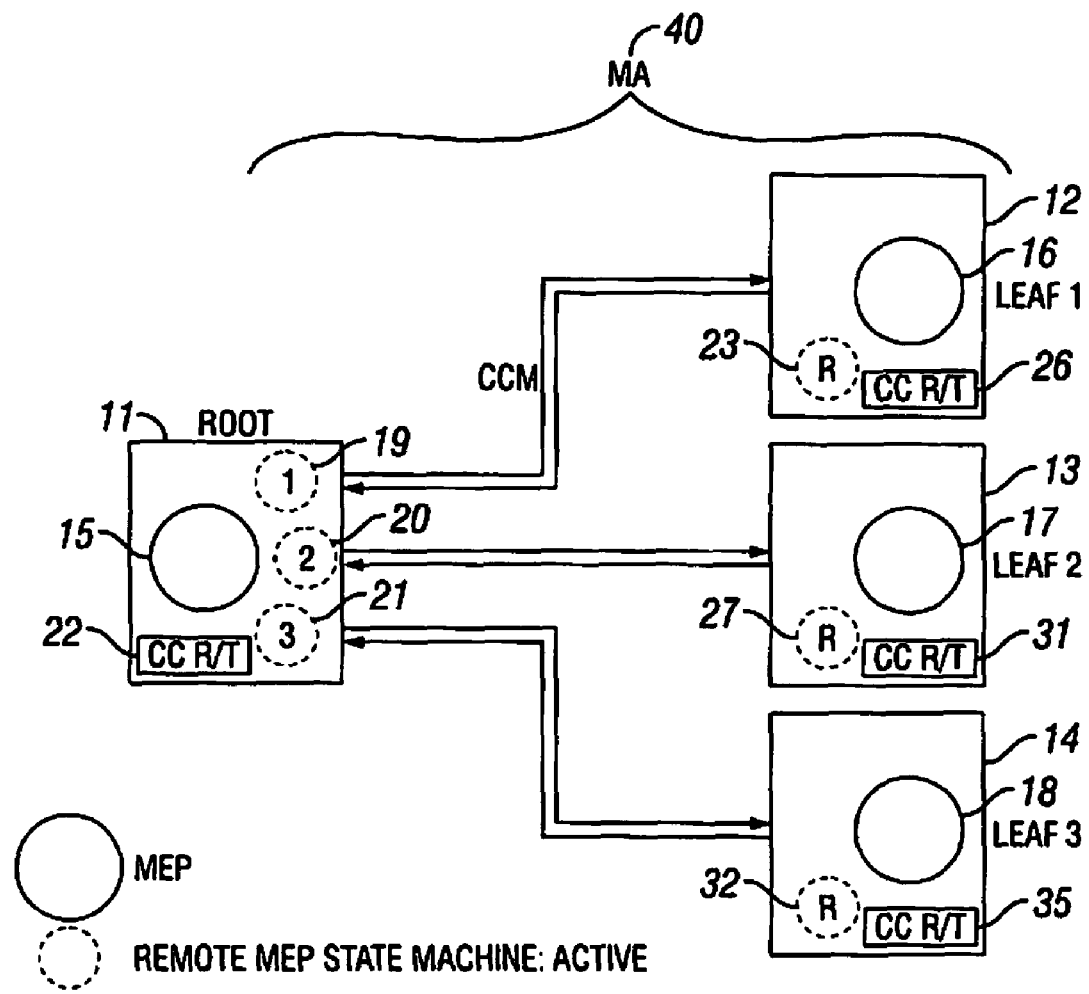
FIG. 2 is a functional block diagram illustrating an architecture of an E-Tree type service instance with a Maintenance Association configured in accordance with an exemplary embodiment of the present invention.

FIG. 2 is a functional block diagram illustrating an architecture of an E-Tree type service instance with a Maintenance Association 40 configured in accordance with an exemplary embodiment of the present invention. In this embodiment, a new configuration parameter is introduced for the MEP that indicates which remote MEP state machines are active (default should be all). For example, the MEP in the root node uses the default configuration, activating all remote MEP state machine instances, while the MEP in each leaf node activates only the remote MEP state machine of the root node.

In IEEE 802.1ag (Connectivity Fault Management), the invention introduces a new configuration parameter in 12.14.7.1.3 (outputs of maintenance association end point managed object). The parameter comprises a list indicating the status of the configured remote MEPs. By default, all configured remote MEPs are active. No defect indication is raised when a MEP does not receive CCMs from remote MEPs that are not active.

The root MEP communicates with all remote MEPs and thus the root utilizes the default configuration in which all remote MEP state machine instances are active. Thus, the root node includes the MEP 15, three Remote MEP state machine instances 19-21 (one for the each of the Leaf MEPs 16-18), and a Continuity Check Receiver/Transmitter 22. The MEP in each leaf deactivates all of the remote MEPs of other leaves, leaving only the root MEP active. Thus, Leaf-1 includes the MEP 16, one active Remote MEP state machine instance 23 for the root MEP, and the Continuity Check Receiver/Transmitter 26. Leaf-2 includes the MEP 17, one active Remote MEP state machine instance 27 for the root MEP, and the Continuity Check Receiver/Transmitter 31. Leaf-3 includes the MEP 18, one active Remote MEP state machine instance 32 for the root MEP, and the Continuity Check Receiver/Transmitter 35.

In operation, each leaf node exchanges CCMs with the root node 11, but not with the other leaf nodes. In this configuration, no defect indication is raised when the operation is normal because the leaf nodes do not expect to receive CCMs from other leaf nodes since their remote MEPs are deactivated. Any defect in the leaf nodes is recognized by the root node 11.

Figure 3:
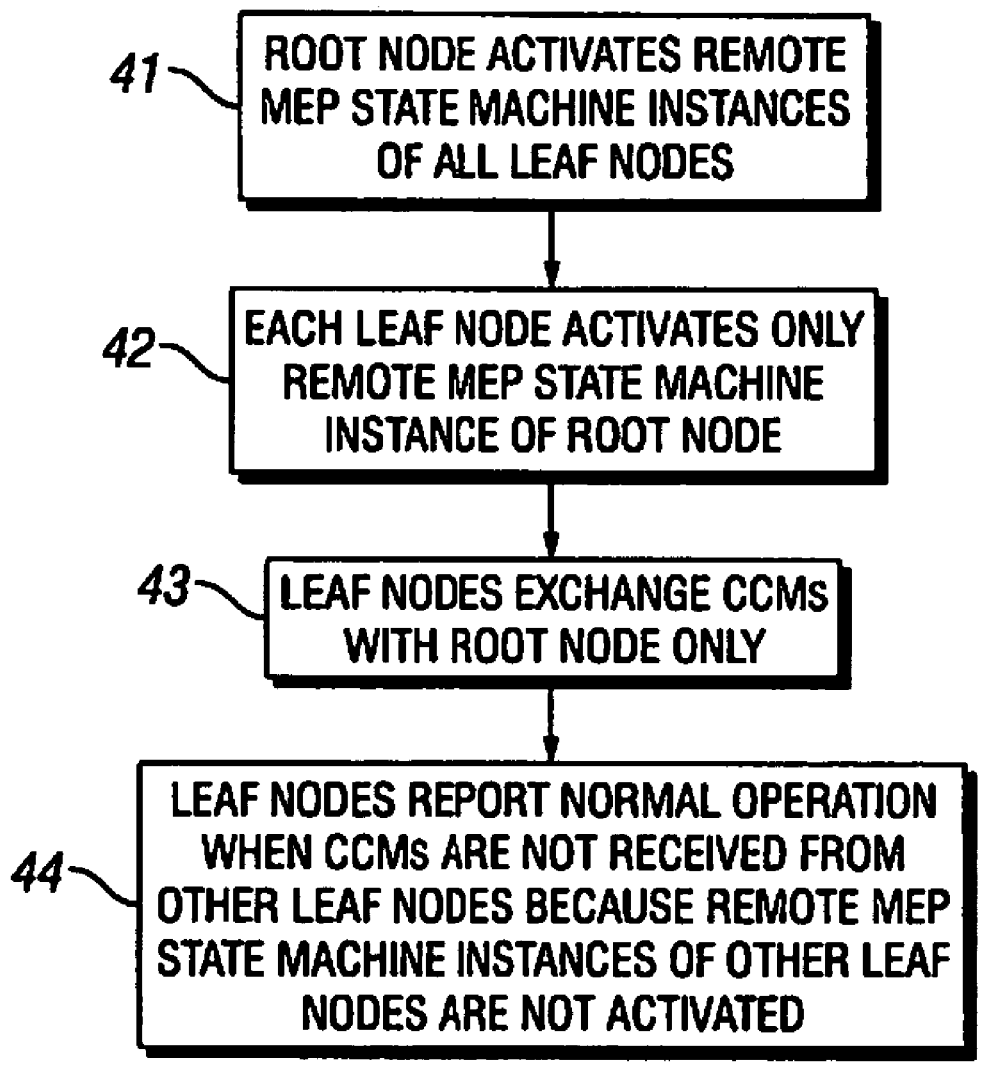
FIG. 3 is a flow chart of a preferred embodiment of the method of the present invention.

FIG. 3 is a flow chart of a preferred embodiment of the method of the present invention. At step 41, the root node 11 activates the remote MEP state machine instances of all leaf nodes. At step 42, each leaf node 12-14 activates only the remote MEP state machine instance of the root node. At step 43, the leaf nodes exchange CCMs with the root node only. At step 44, the leaf nodes report normal operation when CCMs are not received from other leaf nodes because the remote MEP state machine instances of the other leaf nodes are not activated.

Figure 4:
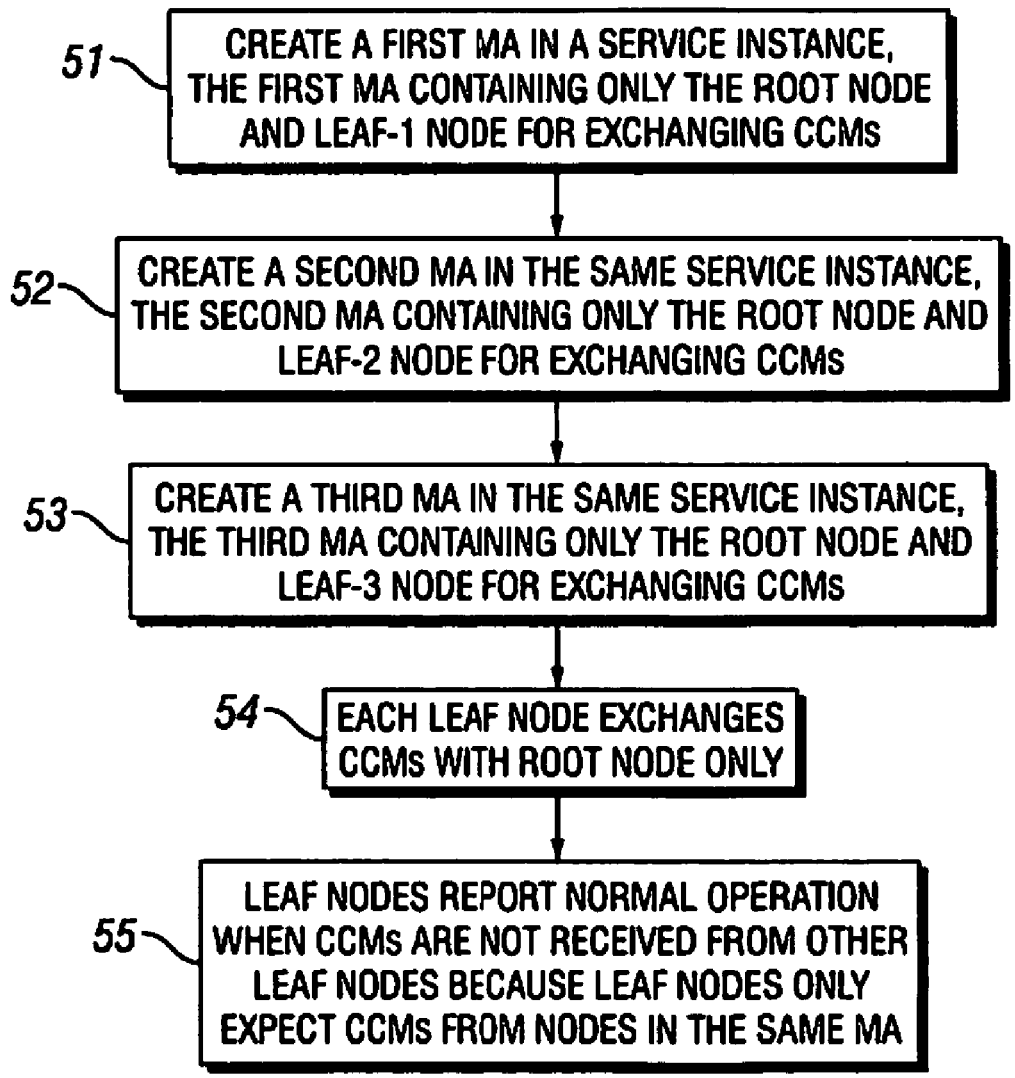
FIG. 4 is a flow chart of an alternative embodiment of the method of the present invention.

FIG. 4 is a flow chart of an alternative embodiment of the method of the present invention. At step 51, a first Maintenance Association (MA) is created in a service instance. The first MA contains only the root node 11 and the leaf-1 node 12 for exchanging CCMs. At step 52, a second MA is created in the same service instance. The second MA contains only the root node 11 and the leaf-2 node 13 for exchanging CCMs. At step 53, a third MA is created in the same service instance. The third MA contains only the root node 11 and the leaf-3 node 14 for exchanging CCMs. At step 54, each leaf node exchanges CCMs with the root node only. At step 55, the leaf nodes report normal operation when CCMs are not received from other leaf nodes because the leaf nodes only expect CCMs from nodes in the same MA.

Although various embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention as defined by the following claims.

The invention claimed is:

1. A method of configuring Maintenance Association Endpoints (MEPs) for an Ethernet Tree (E-Tree) type service instance in which a root MEP communicates with each of a plurality of leaf MEPs, said method comprising the steps of:

activating by a processor, a remote MEP state machine instance within the root MEP for each of the plurality of leaf MEPs;

activating by the processor or a different processor, a remote MEP state machine instance within each leaf MEP for only the root MEP while leaving the remote MEP state machine instances for all other leaf MEPs in an inactive state; and exchanging Connectivity Check Messages (CCMs) between the root MEP and each leaf MEP, while not exchanging CCMs directly between the leaf MEPs.

2. The method as recited in claim 1, wherein a Maintenance Association includes the root MEP and the plurality of leaf MEPs, and in a default MEP configuration, the remote MEP state machine instances for all other MEPs in the Maintenance Association are activated.

3. The method as recited in claim 1, further comprising reporting by the processor, a defect by a given MEP only if the given MEP fails to receive a CCM from an activated remote MEP state machine instance.

* * * * *

UNITED STATES PATENT AND TRADEMARK OFFICE
CERTIFICATE OF CORRECTION

PATENT NO. : 7,995,488 B2  
APPLICATION NO. : 12/443195  
DATED : August 9, 2011  
INVENTOR(S) : Ding et al.

Page 1 of 1

It is certified that error appears in the above-identified patent and that said Letters Patent is hereby corrected as shown below:

On Title Page 2, Item (56), under "OTHER PUBLICATIONS" in Column 1, Line 2, delete ""Carr1er" and insert -- "Carrier --, therefor.

On Title Page 2, Item (56), under "OTHER PUBLICATIONS" in Column 1, Line 3, delete "Carr1er" and insert -- Carrier --, therefor.

On Title Page 2, Item (56), under "OTHER PUBLICATIONS" in Column 1, Line 7, delete "Wh1tePaper" and insert -- WhitePaper --, therefor.

On Title Page 2, Item (56), under "OTHER PUBLICATIONS" in Column 2, Line 9, delete "Ca11forn1a," and insert -- California, --, therefor.

Signed and Sealed this  
Twenty-first Day of February, 2012

David J. Kappos  
*Director of the United States Patent and Trademark Office*